P. B. LAWSON.
Expanding Mandrel.

No. 163,217.  Patented May 11, 1875.

Witnesses:
Michael Ryan
Benj. W. Hoffman

P. B. Lawson
by his Attorneys
Rown & Allen

UNITED STATES PATENT OFFICE.

PETER B. LAWSON, OF COLD SPRINGS, NEW YORK.

IMPROVEMENT IN EXPANDING-MANDRELS.

Specification forming part of Letters Patent No. 163,217, dated May 11, 1875; application filed April 26, 1875.

*To all whom it may concern:*

Be it known that I, PETER B. LAWSON, of Cold Springs, in the county of Putnam and State of New York, have invented an Improvement in Expanding-Mandrels for Lathes; and I do hereby declare that the following is a full, clear, and exact description of the same, reference being had to the accompanying drawing, which forms part of this specification.

My improved mandrel consists in a central spindle, having fitted to it one or more centering-collars, and one or more elastic expanding-collars, and furnished with a screw-thread, to which is fitted a nut, by the screwing up of which the expanding-collars are compressed axially, and thereby expanded circumferentially, to make them fit so tightly within the bore of the article to be turned on the mandrel as to firmly secure the said article to the mandrel for turning.

Figure 1:
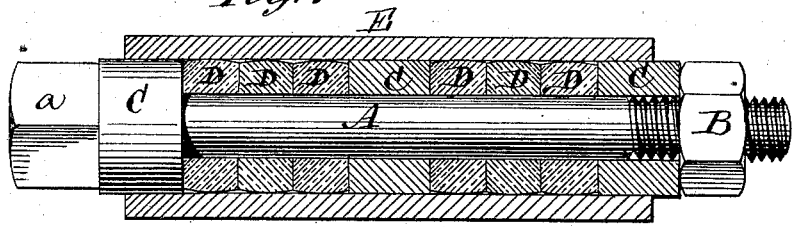
Figure 2:
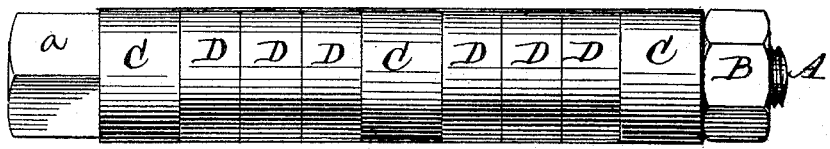

In the accompanying drawing, Figure 1 is a longitudinal sectional view representing my improved mandrel attached to a cylinder to be turned. Fig. 2 is a side view of the mandrel.

A represents a spindle provided with a head, a, at one end, and having the other end screw-threaded for the reception of a nut, B. C C C represent the centering-collars surrounding the spindle, made of steel, iron, or other metal, and having an external diameter corresponding with the bore of the cylinder or other hollow article to be turned. These collars fit accurately but easily on the spindle, and also within the bore of the cylinder or other hollow article to be turned, so that while they are allowed to slide longitudinally upon the spindle they are accurately centered therein, and serve to center accurately the article to be turned. The number of centering-collars, and their distances from each other on the spindle, may be governed by the length of the article to be turned. Between each two of the centering-collars is arranged one or more elastic expanding-collars, D, of india-rubber, or other suitable elastic material. These expanding-collars fit nicely on the spindle A, and their diameter corresponds with that of the bore of the article to be turned sufficiently to allow the spindle to be readily inserted therein. Where the diameter of the bore of the article to be turned is not uniform throughout, the collars may be made of different diameters to correspond with the different diameters of said hollow article.

In using my improved mandrel, the spindle carrying the collars C D and nut B is inserted in the hollow article E, so as to allow its ends to protrude, and at least two of the centering-collars to bear against the surface of the bore. The nut B is then screwed up so as to force the centering-collars toward each other, and compress the elastic collars D between the centering-collars C, and expand them laterally, and cause them to adhere so tenaciously to the surface of the bore as to attach the article securely to the mandrel, and cause it to turn therewith when placed in the lathe. If desired, there may be a number of sets of collars of different diameters, and the same spindle may be used for the different sets, so as to obviate the necessity for more than one spindle.

What I claim as new, and desire to secure by Letters Patent, is—

An expanding-mandrel, consisting of a central screw-threaded spindle, A, a nut, B, one or more centering-collars, C, and one or more expanding-collars, D, combined substantially as herein described.

PETER B. LAWSON.

Witnesses:
S. F. BARROWS,
GOUVR. KEMBLE, Jr.